United States Patent
Edwards et al.

(10) Patent No.: US 6,793,406 B1
(45) Date of Patent: Sep. 21, 2004

(54) LIGHT SOURCE MONITORING APPARATUS

(76) Inventors: Phillip J. Edwards, 6721 Positano Ln., San Jose, CA (US) 95138; Bradley S. Levin, 628 Forest Ave., Apt. C, Palo Alto, CA (US) 94301; Michael M. O'Toole, 5913 Foligno Way, San Jose, CA (US) 95138; Joseph John Vandenberg, 415 N. Lark Ellen Ave., West Covina, CA (US) 91791

( * ) Notice: Subject to any disclaimer, the term of this patent is extended or adjusted under 35 U.S.C. 154(b) by 35 days.

(21) Appl. No.: 10/044,648

(22) Filed: Jan. 11, 2002

Related U.S. Application Data

(60) Provisional application No. 60/275,091, filed on Mar. 12, 2001.

(51) Int. Cl.[7] ................................................. G02B 6/42
(52) U.S. Cl. ............................. 385/88; 385/92; 385/93
(58) Field of Search ..................................... 385/88–94

(56) References Cited

U.S. PATENT DOCUMENTS

| | | | | |
|---|---|---|---|---|
| 5,696,862 A | * | 12/1997 | Hauer et al. | 385/88 |
| 5,787,215 A | * | 7/1998 | Kuhara et al. | 385/88 |
| 5,838,859 A | * | 11/1998 | Butrie et al. | 385/92 |
| 6,027,255 A | * | 2/2000 | Joo et al. | 385/88 |
| 6,302,596 B1 | * | 10/2001 | Cohen et al. | 385/93 |
| 6,374,021 B1 | * | 4/2002 | Nakanishi et al. | 385/49 |
| 6,459,710 B1 | * | 10/2002 | Whitney et al. | 372/29.02 |
| 6,529,535 B2 | * | 3/2003 | Katayama et al. | 372/36 |
| 2003/0002822 A1 | * | 1/2003 | Ishihara et al. | 385/88 |
| 2003/0053222 A1 | * | 3/2003 | Togami et al. | 359/726 |
| 2003/0053769 A1 | * | 3/2003 | Schunk | 385/93 |

* cited by examiner

*Primary Examiner*—John D. Lee
*Assistant Examiner*—Tina M Lin
(74) *Attorney, Agent, or Firm*—Parsons & Goltry; Robert A. Parsons; Michael W. Goltry

(57) ABSTRACT

Light source monitoring apparatus includes a light source having drive electronics for supplying drive current to the light source. A monitor diode is connected to the drive electronics for controlling the amount of drive current supplied to the light source. A lens system is positioned to receive the beam of light from the light source and transmit substantially all of the beam of light along an optical axis to a light terminal. The lens system includes a first lens element positioned along the optical axis and adjacent the light source and a second lens element positioned along the optical axis and adjacent the light terminal. A light reflecting surface in the lens system is positioned along the optical axis to reflect a portion of the beam of light at an angle to the optical axis onto the monitor diode.

29 Claims, 2 Drawing Sheets

LIGHT SOURCE MONITORING APPARATUS

CROSS REFERENCE TO RELATED APPLICATION

This application claims the benefit of U.S. Provisional Application No. 60/275,091, filed Mar. 12, 2001.

FIELD OF THE INVENTION

This invention relates to light sources used in optoelectric modules and the like.

More particularly, the present invention relates to light source monitoring apparatus used in optoelectric modules and other electronic equipment.

BACKGROUND OF THE INVENTION

In optical-to-electrical and electrical-to-optical (hereinafter "optoelectric") modules used in the various communications fields, one of the most difficult problems that must be solved i s the efficient transmission of light between a light generating device and an optical fiber or, alternatively, the transmission of light from the optical fiber to a light receiving device. Here it will be understood by those skilled in the art that the term "light" is a generic term which includes any electromagnetic radiation that can be modulated and transmitted by optical fibers or other optical transmission lines.

Because of light losses due to misalignment of optical components and other losses in the system, it is often necessary to drive light sources, such as lasers, light emitting diodes, etc. harder (i.e., provide more current) to provide sufficient light for proper operation. Also, because of minor changes in alignment of components, differences in components (although they may still be within a specified tolerance), aging of components and especially the light source itself, and other factors, it is often necessary to change the amount of drive to the light sources between similar optoelectric apparatus and in a specific appatratus over a lifetime. For example, it is well know in the art that the light output of semiconductor laser (including vertical cavity surface emitting lasers 'VCSELs', edge emitting lasers, etc.) varies with changes in conditions.

It is understood by those skilled in the art that too much drive to a light source results in wasted power, overheating, reduced life cycle, and other problems. However, too little drive to a light source results, in improper operation, possible loss of information in data systems, random errors, and many other problems. Thus, it is highly desirable to provide drive to light sources that is as close to optimum as possible. To achieve this result it is generally desirable to continuously monitor the output of the light source to ensure a constant level of light output. A variety of light source monitors have been proposed in the prior art. However, these prior art monitoring systems are generally complicated and expensive to incorporate into optoelectric modules and other apparatus.

It would be highly advantageous, therefore, to remedy the foregoing and other deficiencies inherent in the prior art.

Accordingly, it is an object the present invention to provide new and improved light source monitoring apparatus.

Another object of the present invention is to provide new and improved light source monitoring apparatus which uses a minimum number of components in the system.

And another object of the present invention is to provide new and improved light source monitoring apparatus which improves the efficiency of optical systems.

Still another object of the present invention is to provide new and improved light source monitoring apparatus which allows the use of a variety of components and component materials.

SUMMARY OF THE INVENTION

Briefly, to achieve the desired objects of the present invention in accordance with a preferred embodiment thereof, provided is light source monitoring apparatus including a light source designed to produce a beam of light. The light source includes drive electronics connected to the light source to supply a desired amount of drive current to the light source. A monitor diode is connected to the drive electronics to control the amount of drive current supplied to the light source by the drive electronics. A lens system is positioned to receive the beam of light from the light source and transmit substantially all of the beam of light to a light terminal. The lens system includes an optical element and a light reflecting surface on the optical element positioned to reflect a portion of the beam of light onto the monitor diode.

In a preferred embodiment the lens system includes a pair of lens elements defining an optical axis and directing light from the light source into an optical fiber. A first of the lens elements is positioned along the optical axis adjacent the light source and a second of the lens elements is positioned along the optical axis adjacent the light terminal. The light reflecting surface can be, for example, the back of the second lens element or it can be a third optical element and positioned along the optical axis and between the first and second lens elements to reflect a portion of the beam of light at an angle to the optical axis onto the monitor diode. Further, the first and second lens elements (and the adjacent light source and light terminal, respectively) can be housed in separate structural portions that are later assembled to form a complete unit.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF PREFERRED EMBODIMENTS

Figure 1:
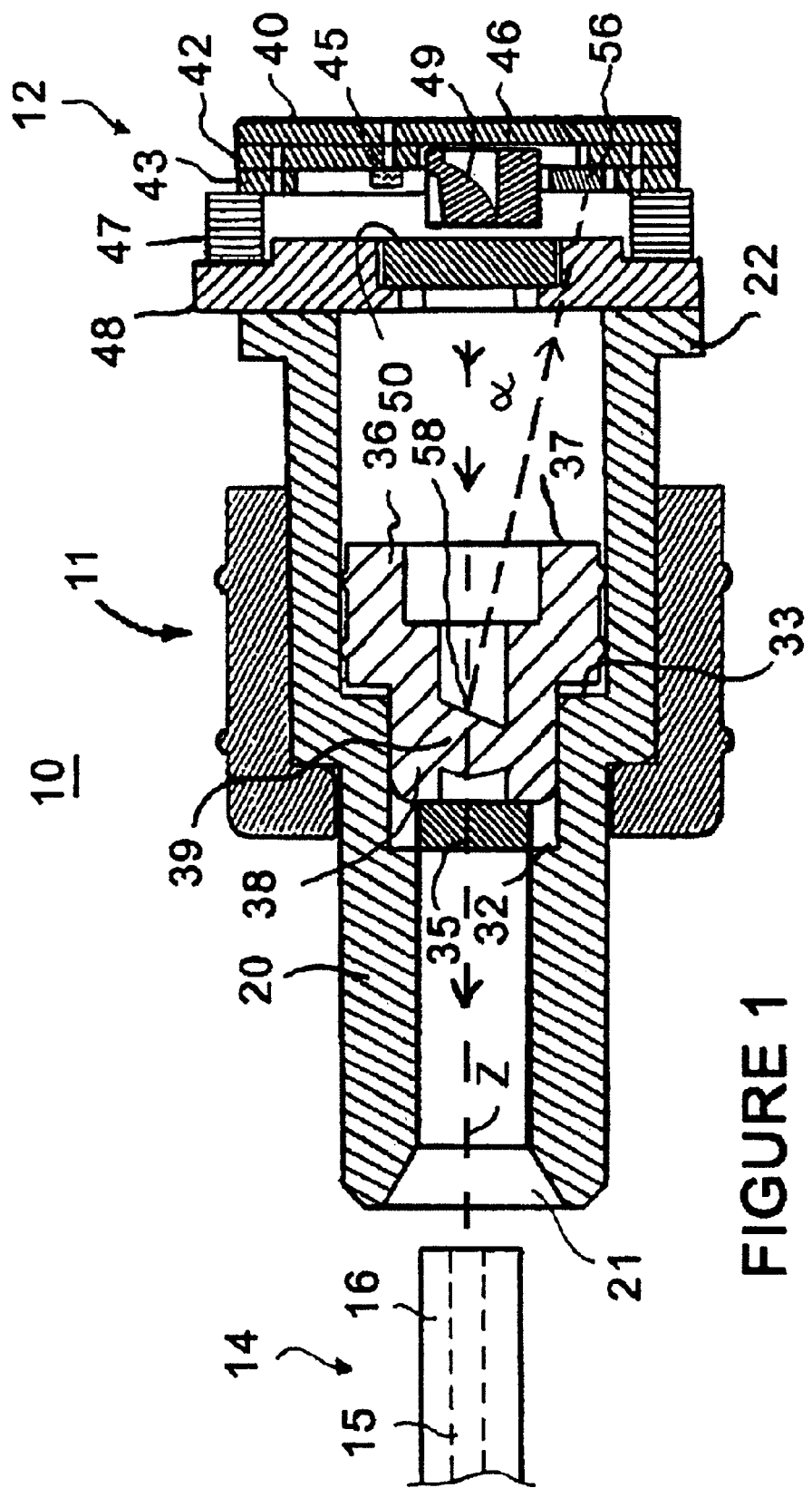
FIG. 1 is a sectional view of a simplified optoelectric module including an embodiment of a light source monitoring system in accordance with the present invention.

The present invention pertains to new and improved light source monitoring apparatus for telecommunication and data communication apparatus and the like and in particular for optoelectric modules. Turning to FIG. 1, a sectional view is illustrated of a simplified optoelectric module 10 in accordance with the present invention. As stated above, the term "optoelectric" is used herein to denote the fact that module 10 can be either an optical-to-electrical or electrical-to-optical module and will generally, include both channels. It will be understood that, since light source monitoring apparatus is being disclosed, the major use of light sources is in the electrical-to-optical portion of the module, which applies to opposite ends of both channels.

Module 10 of FIG. 1 includes a receptacle assembly 11 and an optoelectric package 12 each forming a separate structural portion of module 10. After fabrication, receptacle assembly 11 and optoelectric package 12 are aligned and affixed together, as will be disclosed in more detail below. Receptacle assembly 11 is designed to receive an optical fiber 14 in communication therewith, in a manner that will become clear presently. In the preferred embodiment, optical fiber 14 is a single mode fiber (the use of which 1s one of the major advantages of the present invention) including a glass core 15 and a cladding layer 16. Receptacle assembly 11 includes an elongated cylindrical ferrule 20 defining a fiber receiving opening 21 at one end and a mounting flange 22 at the opposite end.

Progressing from end 21 toward end 22, ferrule 20 has two radially outwardly directed steps 32 and 33. Step 32 provides a surface or stop for the mounting of an optical spacer 35 and step 33 provides a surface or a stop for the positioning of an optical lens element or assembly 36. In this preferred embodiment, lens assembly 36 is formed of plastic and may be, for example, molded to simplify manufacturing of module 10. It should be understood that the term "plastic" is used herein as a generic term to describe any non-glass optical material that operates to transmit optical beams of interest therethrough and which can be conveniently formed into lenses and the like. For example, in most optical modules used at the present time the optical beams are generated by a laser that operates in the infra-red band and any materials that transmit this light, including some oxides and nitrides, come within this definition.

Lens assembly 36 defines a central opening for the transmission of light therethrough from an end 37 to an opposite end 38. A lens 39 is integrally formed in the central opening a fixed distance from end 38. In this specific embodiment, lens assembly 36 is formed with radially outwardly projecting ribs or protrusions in the outer periphery so that it can be press-fit into ferrule 20 tightly against spacer 35.

Thus, lens assembly 36 is frictionally held in place within ferrule 20 and holds spacer 35 fixedly in place. Also, lens 39 is spaced a fixed and known distance from spacer 35. In this preferred embodiment, optical fiber 14 in inserted into ferrule 20 so that glass core 15 buts against spacer 35, which substantially reduces or suppresses return reflections. Further, by forming spacer 35 of glass material with an index of refraction similar to the index of refraction of glass core 15, spreading of the light beam is substantially reduced and lower optical power is required to collimate the beam.

Optoelectric package 12 includes a base or support plate 40 and a mounting plate 42 positioned thereon. One or more spacer rings 43 may be positioned on plate 42 to provide sufficient distance for components mounted thereon. A light source (hereinafter laser 45) is mounted on the upper surface of mounting plate 42 and positioned to transmit light generated therein to a lens element or block 46, including a curved reflecting lens surface 49. In this embodiment, laser 45 may be, for example, any of the well known lasers, light emitting diodes, etc. Lens block 46 is mounted on mounting plate 42 by some convenient means, such as outwardly extending ears (not shown). A ring 47 is positioned on spacer rings 43 and a cap or cover 48 is affixed to ring 47.

Generally, the entire assembly, including plate 40, mounting plate 42, spacer rings 43, ring 47 and cover 48 are fixedly attached together by some convenient means, such as welding, gluing, etc. so that laser 45 is enclosed in a hermetically sealed chamber. However, a hermetic seal is not necessary in many embodiments in which a laser or photodiode are used that is either separately sealed or is not sensitive to atmospheric conditions. Connections to the electrical components discussed herein can be by pigtail or by coupling through plate 40. Also, some circuitry and connections can be incorporated into plate 40 and mounting plate 42, if desired.

Here it should be understood that fixing lens surface 49 relative to laser 45 accurately determines the distance between lens surface 49 and laser 45. Also, fixing lens 39 to optical fiber 14 accurately determines the distance between lens 39 and optical fiber 14. Because these are short distances (on the order of microns), they can be determined relatively accurately. However, the distance between lens 39 and lens surface 49 is less critical, which provides substantially relaxed tolerances for module 10 and for the assembling thereof. The distance between lens 39 and lens surface 49 is not critical because the light is collimated and slight variances in axial position simply produce a small amount of light loss. Also, slight differences in the relative positions along optical axis Z have little or no effect.

A window 50 is sealed in cover 48 so as to be aligned with lens block 46. Lens block 46 includes a curved reflecting lens surface 49 that redirects light from laser 45 at a ninety degree angle out through window 50. While window 50 is illustrated and described as a simple window that allows the transmission of light therethrough, it will be understood that it is an optical element that may include one or more lenses or optical surfaces in specific applications. Further, window 50 is affixed to the underside of cover 48 by some convenient means, such as epoxy or other adhesive, so as to hermetically seal the light transmitting opening through cover 48. Generally, and especially when a hermetic seal is not required, window 50 can be formed (e.g. molded) from plastic. In some applications, lens block 46 may also be molded from plastic for convenience in manufacturing. Also, in some applications it may be convenient to provide a light source (e.g. a VCSEL or LED) that emits directly along optical axis Z, thereby omitting lens block 46 from the lens system. In such a system it may be convenient to replace window 50 with one or more lenses.

Optoelectric package 12 is affixed to receptacle assembly 11 with flange 22 of ferrule 20 butting against the upper surface of cover 48. Further, optoelectric package 12 is optically aligned with receptacle assembly 11 so that light from laser 45 is directed into core 15 of optical fiber 14 along optical axis Z. This alignment can be accomplished in different ways but one reliable method is known as active alignment. In this process, laser 45 is activated and receptacle assembly 11 is positioned approximately over optoelectric package 12. The light in optical fiber 14 is measured and the alignment is adjusted for maximum light. When maximum light is measured alignment has been achieved and receptacle assembly 11 is fixed to optoelectric package 12 by some convenient means, such as welding or adhesive. Because of the separate structural portions, in most applications this alignment and assembly can be accomplished quickly and easily using machines.

Module 10 includes light source monitoring apparatus associated with laser 45. As stated above, because the light output of semiconductor lasers (including vertical cavity surface emitting lasers 'VCSELs', edge emitting lasers, etc.) varies with changes in conditions, it is often desirable to include apparatus for measuring the output of the laser and using that measurement to adjust the laser to keep the output constant. In this embodiment, the light source monitoring apparatus includes a monitor diode 56 mounted on the surface of mounting plate 42. Here it will be understood that the term "monitor diode" represents any convenient electronic device (e.g., photodiode, pin diode, PN diode, etc.) capable of receiving light at the wavelength of interest and converting the received light to electrical signals representative of the strength or amount of received light.

Also, a light reflecting surface 58 is provided in the lens system of module 10 and positioned to reflect a portion of the beam of light from laser 45 onto monitor diode 56. In this specific embodiment, light reflecting surface 58 is formed as a portion of lens 39 in lens assembly 36. In this preferred embodiment, during the formation of lens assembly 36, lens 39 is formed with a substantially flat light inlet surface 58 that is tilted or angled slightly at an angle $\alpha$ with respect to optical axis Z. Angle $\alpha$ is adjusted, both in the amount of the angle and in the direction of the angle so that a constant amount of light is reflected. The amount of angle α of surface 58 is determined during fabrication of lens assembly 36 and the direction of angle α can be adjusted during assembly by rotating lens assembly 36 within ferrule 20.

Here it should be specifically noted that surface 58 is positioned a relatively long distance from lens block 46 (since this distance has little or no effect on the operation of module 10) so that angle α is relatively small and has a minimum effect on light traveling along optical axis Z to optical fiber 14. That is, by minimizing angle α the amount of light that is reflected from the main beam is minimized and the efficiency of the entire system (module 10) remains high. In fact, in some applications, the light inlet surface of lens 39 may be formed (e.g., convex or concave) so that a small amount of natural reflection will be received by monitor diode 56 and additional surfaces may not be required to provide a reflecting surface.

Figure 2:
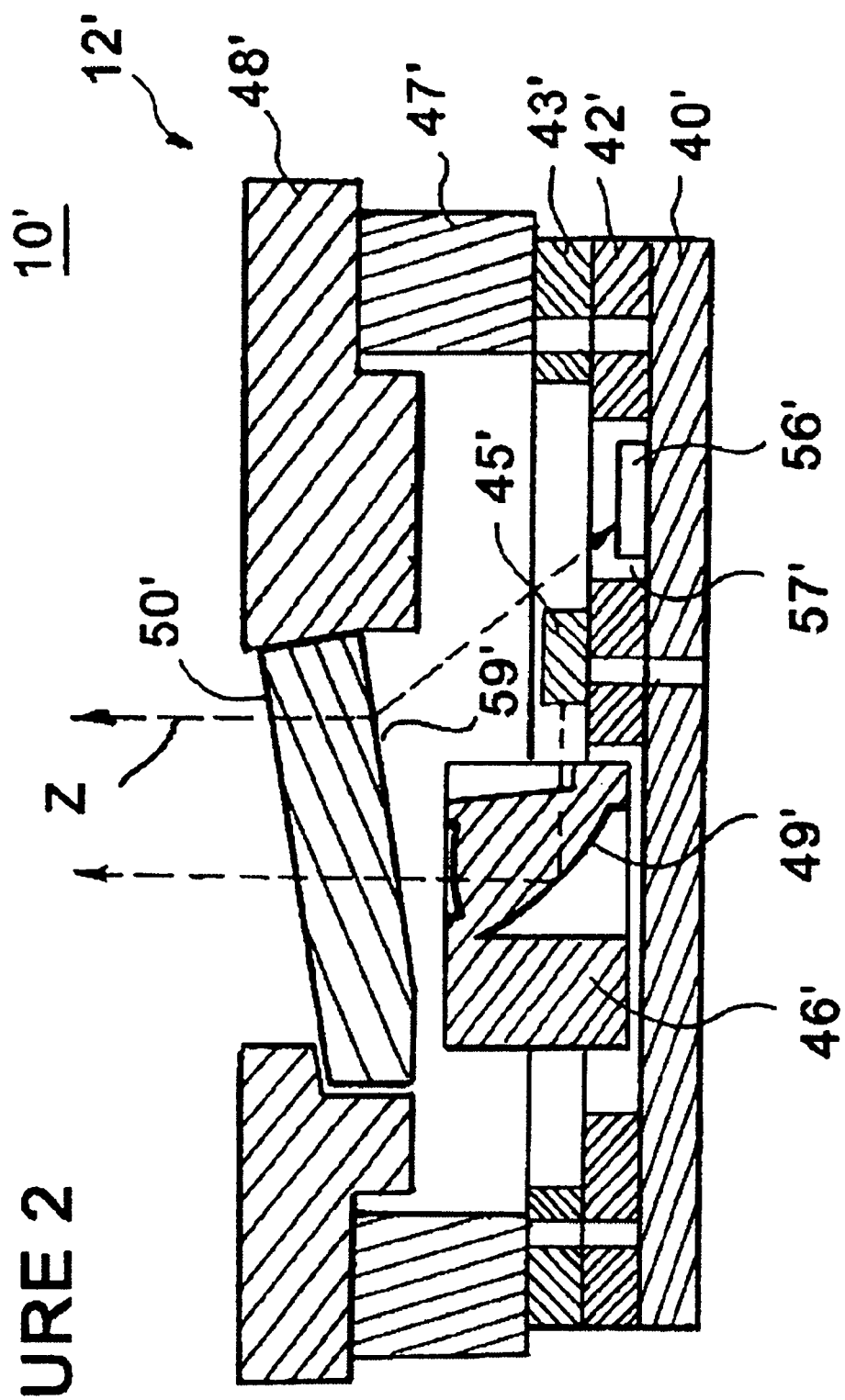
FIG. 2 is an enlarged secional view of a portion of an optoelectric module including another embodiment of a light source monitoring system in accordance with the present invention.

Turning now to FIG. 2, an optoelectric package 12' of a module 10' is illustrated including another embodiment of light source monitoring system in accordance with the present invention. Components in this embodiment which are similar to components in the embodiment of FIG. 1 are designated with similar numbers and all of the numbers have a prime added to indicate the different embodiment.

Optoelectric package 12' includes a base or support plate 40' and a mounting plate 42' positioned thereon. One or more spacer rings 43' may be positioned on plate 42' to provide sufficient distance for components mounted thereon. A light source (hereinafter laser 45') is mounted on the upper surface of mounting plate 42' and positioned to transmit light generated therein to a lens element or block 46'. In this embodiment, laser 45' may be, for example, any of the well known lasers, light emitting diodes, etc. Lens block 46' is mounted on mounting plate 42' by some convenient means, such as outwardly extending ears (no. shown). A ring 47' is positioned on spacer rings 43' and a cap or cover 48' is affixed to ring 47'.

A window 50' is sealed in cover 48' so as to be aligned with lens block 46'. Lens block 46' includes a curved reflecting surface 49' that redirects light from laser 45' at a ninety degree angle out through window 50'. While window 50' is illustrated and described as a simple window that allows the transmission of light therethrough, it will be understood that it is an optical element that may include one or more lenses or optical surfaces in specific applications.

Module 10' includes light source monitoring apparatus associated with laser 45'. As stated above, because the light output of semiconductor lasers (including vertical cavity surface emitting lasers 'VCSELs', edge emitting lasers, etc.) varies with changes in conditions, it is often desirable to include apparatus for measuring the output of the laser and using that measurement to adjust the laser to keep the output constant. In this embodiment, the light source monitoring apparatus includes a monitor diode 56' mounted in a cavity 57' in mounting plate 42'. Here it will be understood that the term "monitor diode" represents any convenient electronic device (e.g., photodiode, pin diode, PN diode, etc.) capable of receiving light at the wavelength of interest and converting the received light to electrical signals representative of the strength or amount of received light.

Also, a light reflecting surface 59' is provided in the lens system of module 10' and positioned to reflect a portion of the beam of light from laser 45' onto monitor diode 56'. In this specific embodiment, light reflecting surface 59' is the light inlet surface of window 50'. In this preferred embodiment, during the assembly of optoelectric package 12', window 50' is tilted or angled slightly at an angle with respect to optical axis Z. The angle is adjusted so that a constant amount of light is reflected onto monitor diode 56'. Here it will be understood that slanted window 50' can be used with any of the direct emitting light sources in which lens block 46' is not used. Also, window 50' can be positioned at any convenient distance from lens block 46' or the light source to optimize the reflection angle α and the amount of unreflected light passing through window 50'.

While the amount of reflected light received by monitor diode 56' is generally not critical, it is desireable that the reflected light is a constant percentage of the total light and sufficient to produce a control signal. Thus, an angle can be determined emperically and that angle can simply be built-into cover 48'. In some specific applications, the amount of the angle can be adjusted during assembly by moving window 50' within the opening in cover 48'. Also, in some specific applications, window 50' can be fabricated with a slanted light inlet surface.

In any of the above described light source monitoring apparatus, the light source includes drive electronics, either internally or associated therewith (e.g. in an electronic module) and connected to the light source to supply an amount of drive current to the light source. The monitor diode is connected to the drive electronics so as to control the amount of drive current supplied to the light source by the drive electronics. Thus, the amount of light generated or produced by the light source can be maintained constant over time and between different modules.

Accordingly, new and improved light source monitoring apparatus are disclosed which are capable of controlling a light source to produce a constant output under varying conditions and which, thereby, Improve the efficiency of optical systems. Because a pair of lenses are incorporated that are fixed relative to a light source and a light receiving structure, respectively, the distance along the Z axis between the pair of lenses is not critical, which allows the placement of a reflecting surface at a convenient distance from the light source. Also, manufacturing tolerances can be substantially reduced, substantially reducing manufacturing time, labor, and costs. Further, the new and improved optical alignment features allow the use of a variety of components and component materials (e.g. plastic lenses and other optical components).

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Light source monitoring apparatus comprising:
 a light source designed to produce a beam of light, the light source including drive electronics connected to the light source to supply an amount of drive current to the light source;
 a monitor diode connected to the drive electronics for controlling the amount of drive current supplied to the light source by the drive electronics;
 a lens system positioned to receive the beam of light from the light source and transmit substantially all of the beam of light to a light terminal, the lens system being separate from the light terminal and including an optical element; and
 a light reflecting surface on the optical element positioned to reflect a portion of the beam of light onto the monitor diode.

2. Light source monitoring apparatus as claimed in claim 1 wherein the lens system includes a first lens element adjacent the light source and a second lens element adjacent the light terminal.

3. Light source monitoring apparatus as claimed in claim 2 wherein the first lens element adjacent the light source provides more optical power than the second lens element.

4. Light source monitoring apparatus as claimed in claim 1 wherein the second lens element is a focusing lens having a curved light outlet side and a light inlet side, and the light inlet side includes the light reflecting surface.

5. Light source monitoring apparatus as claimed in claim 4 wherein the light inlet side of the second lens element includes a flat surface directed at an angle to light impinging on the second lens element from the light source.

6. Light source monitoring apparatus as claimed in claim 2 wherein the second lens element includes a molded plastic lens.

7. Light source monitoring apparatus as claimed in claim 2 wherein the optical element is positioned between the first and second lens elements and the optical element defines a light inlet surface including the light reflecting surface.

8. Light source monitoring apparatus as claimed in claim 7 wherein the optical element includes a light transmitting window.

9. Light source monitoring, apparatus as claimed in claim 2 wherein the first lens element includes a curved reflecting surface.

10. Light source monitoring apparatus as claimed in claim 1 wherein the light source includes a laser.

11. Light source monitoring apparatus as claimed in claim 1 wherein the light terminal includes an end of an optical fiber.

12. Light source monitoring apparatus comprising:
a light source designed to produce a beam of light, the light source including drive electronics connected to the light source to supply an amount of drive current to the light source;
a monitor diode connected to the drive electronics for controlling the amount of drive current supplied to the light source by the drive electronics;
a lens system positioned to receive the beam of light from the light source and transmit substantially all of the beam of light along an optical axis to a light terminal, the lens system being separate from the: light terminal and including a first lens element positioned along the optical axis and adjacent the light source and a second lens element positioned along the optical axis and adjacent to the light terminal; and
a light reflecting surface in the lens system and positioned along the optical axis to reflect a portion of the beam at an angle to the optical axis onto the monitor diode.

13. Light source monitoring apparatus as claimed in claim 12 wherein the first lens element adjacent the light source provides more optical power than the second lens element.

14. Light source monitoring apparatus as claimed in claim 12 wherein the second lens element is a focusing lens having a curved light outlet side and a light inlet side, and the light inlet side includes the light reflecting surface.

15. Light source monitoring apparatus as claimed in claim 14 wherein the light inlet side of the second lens element includes a flat surface directed at an angle to the optical axis.

16. Light source monitoring apparatus as claimed in claim 12 wherein the second lens element includes a molded plastic lens.

17. Light source monitoring apparatus as claimed in claim 12 wherein a third optical element is positioned between the first and second lens elements and the third optical element defines a light inlet surface including the light reflecting surface.

18. Light source monitoring apparatus as claimed in claim 17 wherein the third optical element includes a light transmitting window.

19. Light source monitoring apparatus as claimed in claim 12 wherein the first lens element includes a curved reflecting surface.

20. Light source monitoring apparatus as claimed in claim 12 wherein the light source includes a laser.

21. Light source monitoring apparatus as claimed in claim 12 wherein the light terminal includes an end of an optical fiber.

22. Light source monitoring apparatus comprising:
a first structural portion;
a light source mounted by the first structural portion and designed to produce a beam of light, the light source including drive electronics connected to the light source to supply an amount of drive current to the light source;
a first lens element mounted by the first structural portion and positioned adjacent to the light source;
a second structural portion, the second structural portion being constructed to receive an optical fiber in optical communication therewith;
a second lens element mounted by the second structural portion and positioned to be adjacent but separate from an end of the optical fiber, the first and second lens elements defining an optical axis; and
a light reflecting surface positioned along the optical axis between the first and second lens elements to reflect a portion of the beam at an angle to the optical axis onto the monitor diode.

23. Light source monitoring apparatus as claimed in claim 22 wherein the second lens element is a focusing lens having a curved light outlet side and a light inlet side, and the light inlet side includes the light reflecting surface.

24. Light source monitoring apparatus as claimed in claim 23 wherein the light inlet side of the second lens element includes a flat surface directed at an angle to the optical axis.

25. Light source monitoring apparatus as claimed in claim 22 wherein the second lens element includes a molded plastic lens.

26. Light source monitoring apparatus as claimed in claim 22 wherein a third optical element is positioned between the first and second lens elements and the third optical element defines a light inlet surface including the light reflecting surface.

27. Light source monitoring apparatus as claimed in claim 26 where the third optical element includes a light transmitting window.

28. Light source monitoring apparatus as claimed in claim 22, wherein the first lens element includes a curved reflecting surface.

29. Light source monitoring apparatus as claimed in claim 22 where the light source includes a laser.

* * * * *